Figure 1:
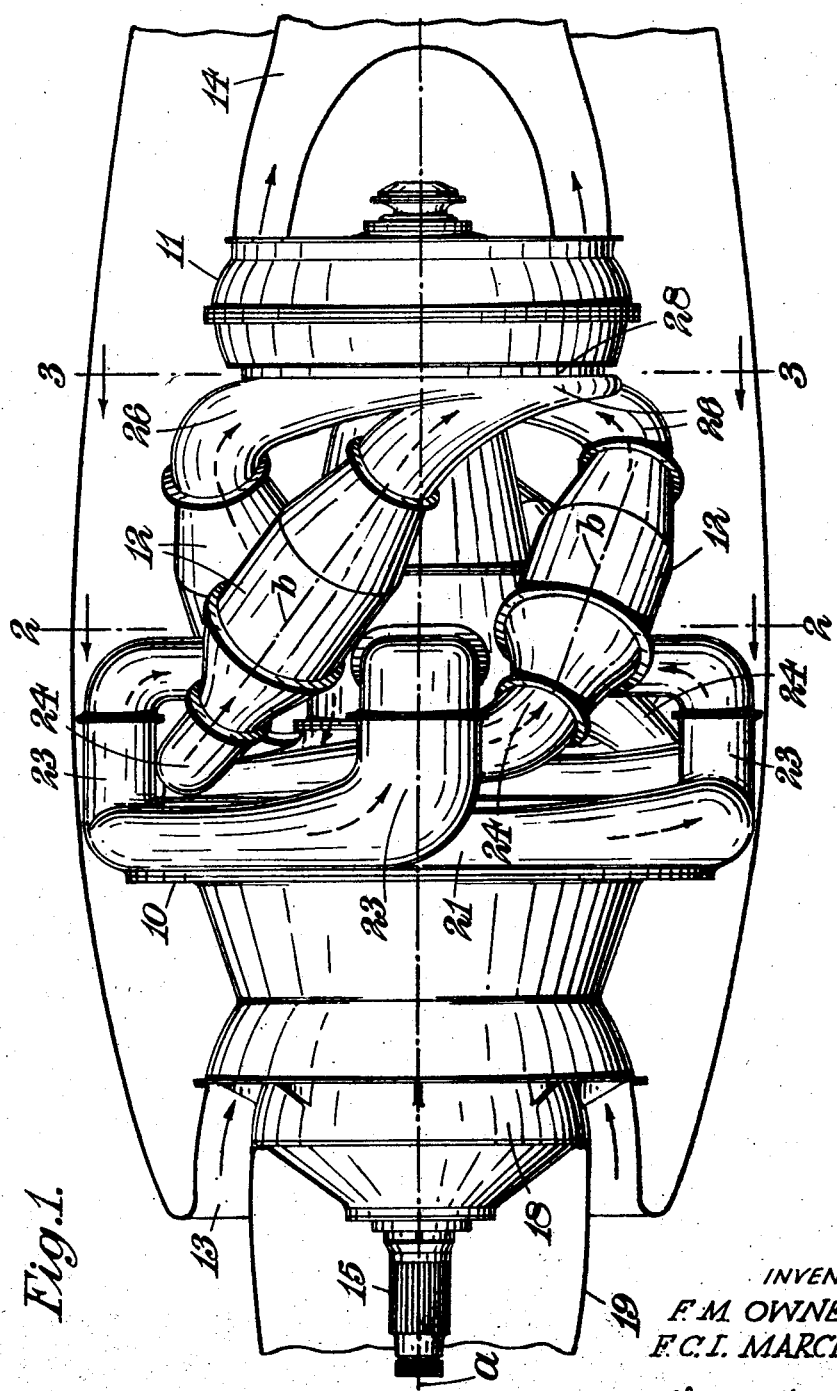

Sept. 4, 1951 F. M. OWNER ET AL 2,567,079
GAS TURBINE POWER PLANT

Filed June 18, 1946 2 Sheets-Sheet 1

INVENTORS
F. M. OWNER &
F. C. I. MARCHANT
By Wilkinson & Mawhinney
ATTORNEYS

Sept. 4, 1951     F. M. OWNER ET AL     2,567,079
GAS TURBINE POWER PLANT
Filed June 18, 1946                         2 Sheets-Sheet 2
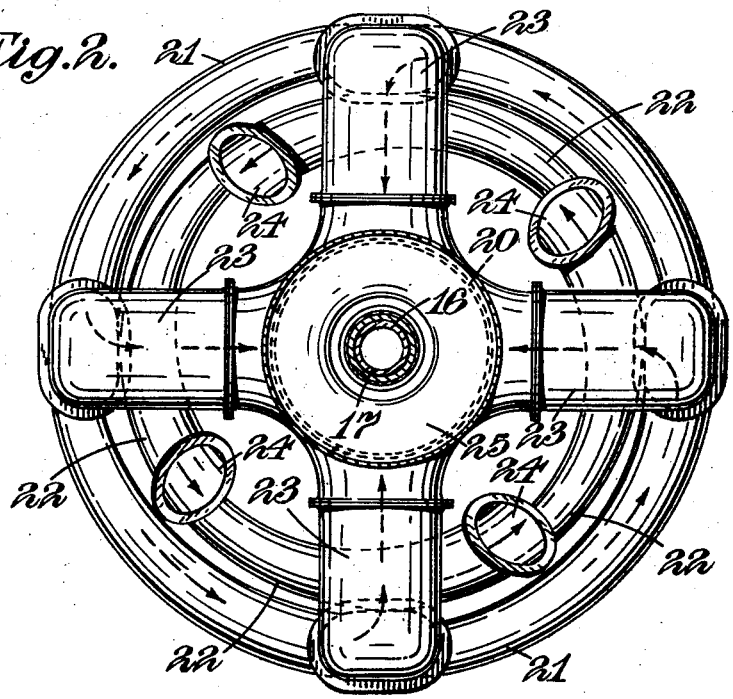
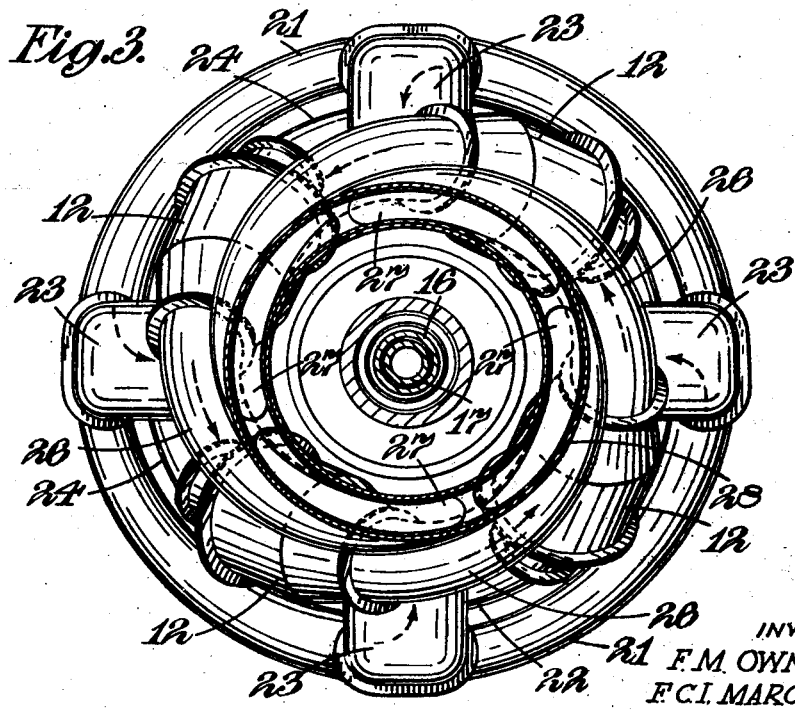
INVENTORS
F. M. OWNER &
F. C. I. MARCHANT
By Wilkinson & Mawhinney
ATTORNEYS Patented Sept. 4, 1951

2,567,079

UNITED STATES PATENT OFFICE 2,567,079

GAS TURBINE POWER PLANT

Frank Morgan Owner and Francis Charles Ivor Marchant, Bristol, England, assignors to The Bristol Aeroplane Company Limited, Bristol, England, a British company Application June 18, 1946, Serial No. 677,496
In Great Britain June 21, 1945

6 Claims. (Cl. 60—39.37)

This invention concerns improvements in or relating to gas turbine power plants and has for its object to provide a compact power plant in which the working fluid is directed through the power plant with the minimum losses. To this end it is particularly desirable that the working fluid be directed into the turbine smoothly and, as far as is practicable, uniformly around the periphery thereof.

According to the present invention a gas turbine power plant comprising a compressor, a gas turbine in line therewith and spaced axially therefrom, said turbine driving the compressor, and a plurality of combustion chambers extending between the compressor and the turbine and connecting the one with the other is characterised in that each combustion chamber is disposed so that the working fluid passing therethrough is directed towards the turbine with a component of movement tangentially of the turbine.

Preferably the combustion chambers are connected with the compressor each by a duct which conveys the working fluid from the compressor in a generally tangential direction thereof.

Each combustion chamber is preferably connected to one end of an arcuate member which extends part way around the circumference of the nozzle ring of the turbine said member extending from its associated combustion chamber to the next adjacent arcuate member in the general direction of flow of the fluid towards the turbine.

The compressor may comprise a first and second centrifugal supercharger, an impeller for each supercharger and a shaft which carries both said impellers so that the entries to the superchargers face in opposite directions, the pair of superchargers being located between said entries. With such a construction of compressor the fluid discharged from the first supercharger may be conveyed to the entry of the second supercharger by a plurality of ducts which are intercalated with the ducts which convey the working fluid from the second supercharger to the plurality of combustion chambers.

Preferably the first supercharger has a greater compression ratio than the second supercharger and, being driven at the same speed, is therefore required to be of greater diameter since with such an arrangement the ducts which connect the second supercharger with the combustion chambers are enabled to pass beneath the ducts which connect the first and second superchargers.

A specific embodiment of the present invention will now be described, by way of example, with reference to the accompanying drawings whereof:

Figure 1 is a side elevation of a gas turbine power plant in accordance with the present invention, and Figures 2 and 3 are respectively sections on the lines 2—2 and 3—3 of Figure 1, the combustion chambers not being shown in Figure 2 for the sake of clarity.

The power plant shown in Figure 1 is adapted to drive an airscrew for the propulsion of an aeroplane, the exhaust gases from the power plant being directed rearwardly from the aeroplane to assist in the propulsion thereof.

Referring to Figure 1: The power plant comprises a compressor generally indicated by the reference numeral 10, a turbine unit 11 and a plurality of combustion chambers 12 which connect the compressor 10 with the turbine unit 11. The working fluid is drawn into the power plant through an annular intake 13 located immediately behind the airscrew (not shown) and passes in succession through the compressor 10, the combustion chambers 12 and the turbine unit 11 and is finally ejected through a rearwardly directed tail pipe 14 to assist in the propulsion of the aeroplane. The turbine unit 11 as is clear from Figure 1 is disposed behind the compressor 10 and spaced axially therefrom and the compressor and turbine unit rotate about a common axis which is the longitudinal axis of the power plant. This axis is indicated by the chain dotted line $a$ of Figure 1.

The turbine unit 11 comprises a pair of rotors one of which is provided to drive the compressor 10 and the other to drive an airscrew shaft 15. The compressor rotor is connected with the compressor by a tubular shaft 16 (Figure 3) and nested therein is a co-axial shaft 17 which connects the airscrew rotor with a reduction gearing carried in a housing 18 disposed centrally within the air intake 13 to the power plant. The output shaft 15 of the reduction gearing carries an airscrew the spinner 19 of which forms an extension to the reduction gear housing 18 so that there is provided a smooth entry for the air to the power plant.

The compressor 10 comprises a pair of centrifugal superchargers the impellers of which are mounted upon the outer shaft 16. It follows therefore that the pair of impellers are driven at the same speed and in the same direction of rotation.

The working fluid entering the power plant at the intake 13 enters one of the superchargers (the first supercharger) where it is compressed and discharged to the other supercharger (the second supercharger), the arrangement being that the entry to the first supercharger faces towards and connects with the air intake 13 whilst the entry 20 (Figure 2) to the second supercharger faces in the opposite direction, that is towards the turbine unit 11: in this way the superchargers of the compressor unit 10 are disposed between the two entries.

Each supercharger is provided in known manner with a casing within which the impeller rotates and a volute casing which receives the air from the impeller. The volute casing of the first supercharger is indicated by the reference numeral 21 and the volute casing of the second supercharger by the numeral 22. A plurailty of ducts 23 extend from the periphery of the volute casing 21, these ducts being radially directed inwards to the entry 20 of the second supercharger and being in communication therewith (Figure 2). Similarly a plurality of ducts 24 extend from the periphery of the volute casing 22 these ducts being connected each with one of the combustion chambers 12.

It is clear from the accompanying drawings that the ducts 23 are so disposed in relation to the volute casing 21 that the working fluid is discharged from the first supercharger in a generally tangential direction and is then conveyed radially inwards towards an annular chamber 25 which defines the entry 20 to the second supercharger. Similarly each of the ducts 24 is disposed in relation to the volute casing 22 so that the working fluid is directed from the second supercharger in a generally tangential direction also.

In the particular arrangement being described four ducts 23 are provided which are equally spaced around the periphery of the volute casing 21, a similar number of ducts 24 being provided for the volute casing 22, these ducts also being equally spaced around the casing. The arrangement is that the ducts 23, 24 are intercalated so that each duct 24 passes between adjacent pairs of ducts 23 towards a combustion chamber 12.

The first supercharger is of greater compression ratio than the second supercharger and being rotated at the same speed as the latter it is of necessity of greater diameter. Advantage is taken of this to arrange that the ducts 24 pass beneath the ducts 23 and in this way the diametral dimension of the compressor 10 (and hence of the power plant since this dimension is greater than of any other part of the unit) is reduced to a minimum.

The combustion chambers 12 extend from the compressor 10 to the turbine unit 11 each with its long axis b inclined to the long axis a of the power plant so that the working fluid is conveyed towards the turbine unit with a tangential component of movement. In this way a longer combustion chamber may be provided (which is of particular advantage when the overall length of the power plant is reduced to a minimum) and moreover the working fluid enters the turbine smoothly and with the minimum of loss. The discharge end of each combustion chamber 12 gives in to an arcuate member 26 which is itself in communication over its length with the nozzle ring of the turbine unit 11 by means of the opening 27 in the casing 28. As is clear from Figure 1 each combustion chamber 12 is connected to one end of its associated arcuate member 26 which extends therefrom to the next adjacent arcuate member in the direction of flow of the working fluid from the combustion chamber to the nozzle ring. The working fluid therefore enters the turbine unit 11 uniformly around the periphery of the nozzle ring and, as indicated above, the inclined disposition of the combustion chambers ensures that this is done smoothly.

As has been stated above there are four ducts 24 leading from the second supercharger each of which connects with a combustion chamber 12 and it therefore follows that there are four arcuate members 26 each of which extends over a quarter of the periphery of the nozzle ring.

We claim:

1. A gas-turbine engine comprising a low-pressure centrifugal compressor having an intake for ambient air, a high-pressure centrifugal compressor having an inlet for air from the low-pressure compressor, said compressors lying back to back with said inlets directed in opposite directions, a gas-turbine spaced axially of the compressors, a driving connection between the turbine and the pair of compressors, a generally cylindrical shell structure joining the compressors and turbine and disposed about the common axis of the turbine and compressors, a plurality of combustion chambers spaced circumferentially around said shell disposed along substantially the same axial portion of the length of the shell, a plurality of circumferentially spaced inwardly-directed ducts leading air from the low to the high-pressure compressor and a plurality of ducts intercalated with said first ducts and leading air from the high-pressure compressor one each to a combustion chamber the long axis of which is disposed tangentially to the cylindrical shell and disposed helically thereabout.

2. A gas-turbine engine according to claim 1 wherein each combustion chamber is connected with the turbine by a channel member which extends circumferentially part way around the turbine to the next adjacent member.

3. A gas-turbine engine as claimed in claim 2 wherein the low-pressure compressor is of greater diameter than the high-pressure compressor and the ducts which connect the high-pressure compressor with the combustion chambers pass beneath the ducts connecting the low and high-pressure compressors.

4. A gas-turbine engine comprising a low-pressure centrifugal compressor having an intake for ambient air, a high-pressure centrifugal compressor having an inlet for air from the low-pressure compressor, said compressors lying back to back with said inlets directed in opposite directions, a gas-turbine spaced axially of the compressors, a driving connection between the turbine and the pair of compressors, a generally cylindrical shell structure joining the compressors and turbine and disposed about the common axis of the turbine and compressors, a plurality of combustion chambers spaced circumferentially around said shell disposed along substantially the same axial portion of the length of the shell, a plurality of circumferentially spaced inwardly-directed ducts leading air from the low to the high-pressure compressor and a plurality of ducts intercalated with said first ducts and leading air from the high-pressure compressor one each to a combustion chamber the long axis of which is disposed tangentially to the cylindrical shell and disposed helically thereabout, a plurality of duct members connecting the combustion chambers and said turbine, the portion of said circumferentially spaced inwardly-directed ducts between said combustion chambers and said turbine extending partway around the circumference of said turbine to the next adjacent duct member for directing the working fluid to the compressor on a tangent to the nozzle blading of the turbine.

5. A gas turbine engine as claimed in claim 4 characterized by the fact that said high pressure compressor and said turbine and the duct arrangement joining said high pressure compressor including the combustion chambers is of a lesser axial diameter than said low pressure compressor whereby the axial dimension of the engine is reduced to a minimum.

6. A gas-turbine engine comprising a low-pressure centrifugal compressor having an inlet for ambient air, a high-pressure centrifugal compressor having an inlet for air from the low-pressure compressor, said compressors lying back to back with said inlets directed in opposite directions, a gas-turbine spaced from the compressors along a common axis, a driving connection between the turbine and the pair of compressors, a generally cylindrical shell structure joining the compressors and turbine and coaxial therewith, a plurality of combustion chambers spaced circumferentially around said shell disposed along substantially the same axial portion of the length of the shell and communicating with the turbine, a plurality of circumferentially spaced inwardly-directed ducts leading air from the low to the high-pressure compressor, and a plurality of ducts intercalated with said first ducts and leading air from the high-pressure compressor one each to a combustion chamber, said combustion chambers being disposed helically about said shell.

FRANK MORGAN OWNER.
FRANCIS CHARLES IVOR MARCHANT.

REFERENCES CITED

The following references are of record in the file of this patent:

UNITED STATES PATENTS

| Number | Name | Date |
| --- | --- | --- |
| 948,292 | Giesler | Feb. 1, 1910 |
| 1,218,223 | Smoot | Mar. 6, 1917 |
| 1,392,090 | Tamini | Sept. 27, 1921 |
| 2,056,198 | Lasley | Oct. 6, 1936 |
| 2,135,939 | Harper | Nov. 8, 1938 |
| 2,399,046 | Larrecq | Apr. 23, 1946 |
| 2,400,714 | Rowledge | May 21, 1946 |
| 2,404,334 | Whittle | July 16, 1946 |
| 2,473,356 | Birmann | June 14, 1949 |
| 2,504,181 | Constant | Apr. 18, 1950 |